Patented May 1, 1945

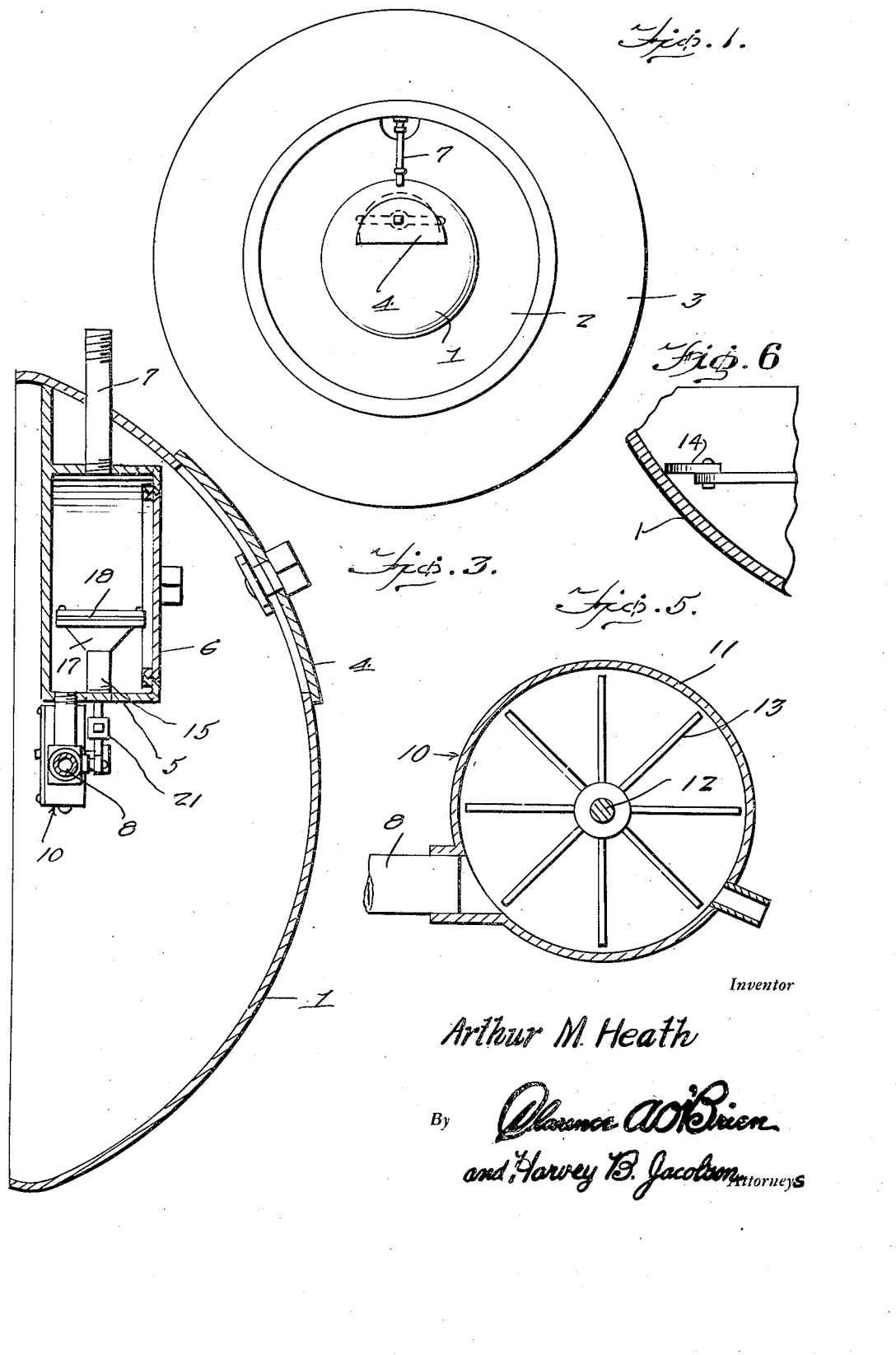

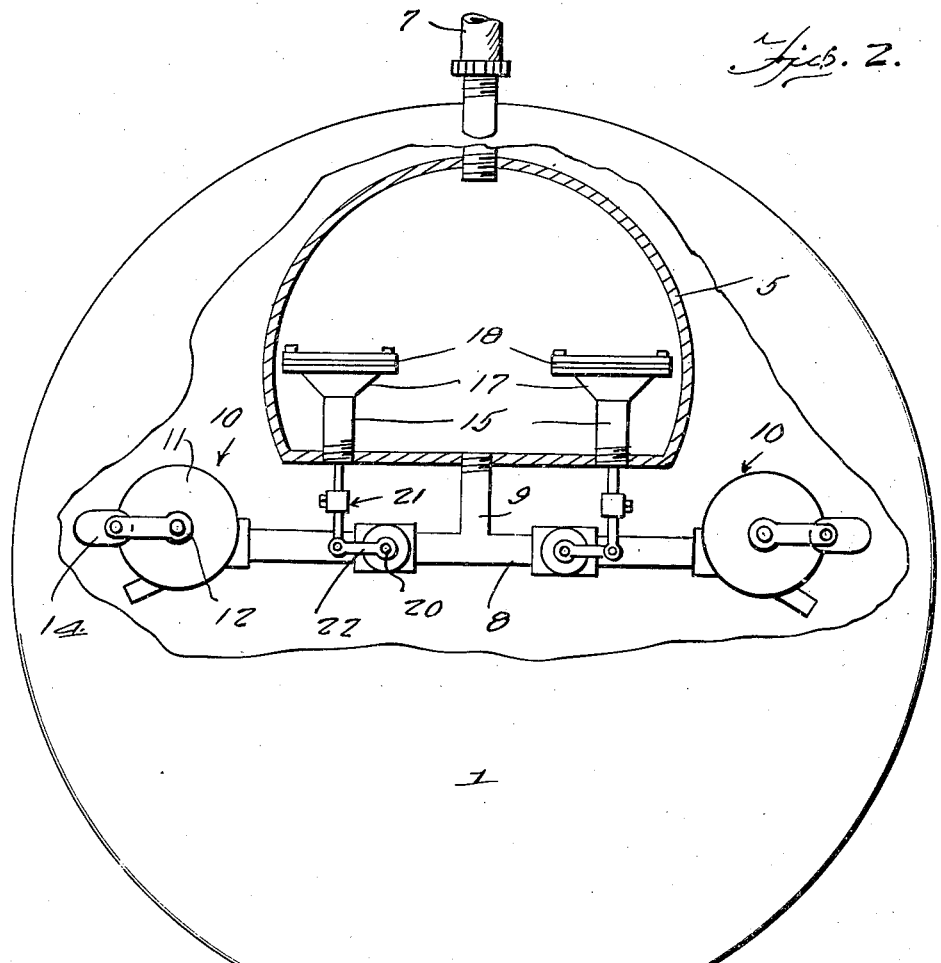
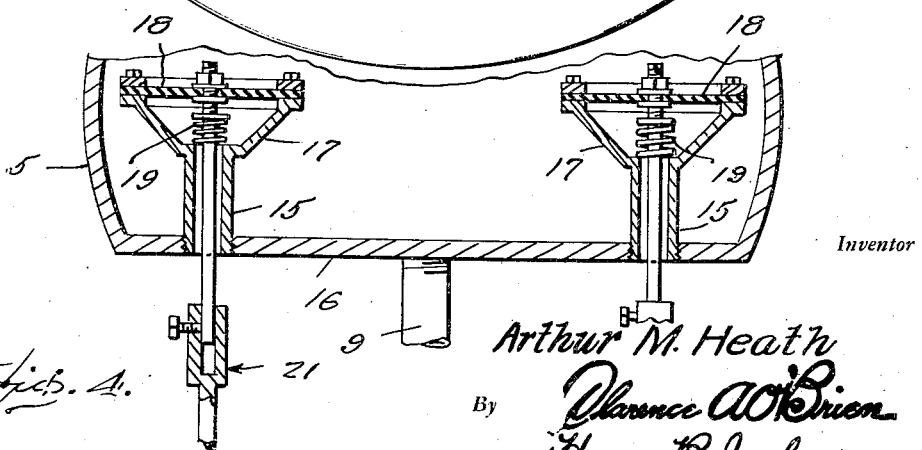

2,374,748

UNITED STATES PATENT OFFICE 2,374,748

TIRE PRESSURE ALARM

Arthur M. Heath, Houston, Tex.

Application May 21, 1942, Serial No. 443,976

2 Claims. (Cl. 116—34)

The present invention relates to new and useful improvements in tire pressure alarms, particularly for motor vehicles, and has for its primary object to provide, in a manner as hereinafter set forth, a device of this character comprising novel means for signalling when the tire is either over-inflated or under-inflated.

Other objects of the invention are to provide a tire pressure alarm of the aforementioned character which will be comparatively simple in construction, strong, durable, highly efficient and reliable in use, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation, showing a tire pressure alarm constructed in accordance with the present invention mounted on a vehicle wheel.

Figure 2 is a view in side elevation of the hub cap with a portion thereof broken out, showing the air pressure chamber in vertical section.

Figure 3 is a view in vertical section through the device.

Figure 4 is a fragmentary view in vertical section through the lower portion of the pressure chamber.

Figure 5 is a view in vertical section through one of the air actuated motors.

Figure 6 is a fragmentary view in horizontal section, showing one of the clappers striking the hub cap.

Referring now to the drawings in detail, it will be seen that the embodiment of the invention which has been illustrated comprises a hub cap 1 for a vehicle wheel 2. A pneumatic tire on the wheel 2 is indicated at 3. A removable plate 4 permits access to be had to the interior of the hub cap 1. An air pressure chamber 5 is mounted in the upper portion of the hub cap 1. A removable closure 6 permits access to be had to the interior of the pressure chamber 5. A conduit 7, including a flexible section, connects the pressure chamber 5 to the usual valve stem of the tire 3.

A horizontal pipe 8 in the hub cap 1 is connected at an intermediate point, as at 9, to the pressure chamber 5. Air actuated motors 10 are mounted on the ends of the pipe 8. In the embodiment shown, the motors 10 include circular casings 11 which communicate with the pipe 8. Journaled in the casings 11 are shafts 12 having vanes 13 fixed thereon. Clappers 14 are fixed on one end portion of the shafts 12, said clappers being engageable with the hub cap 1 when the motors 10 are actuated.

Tubes 15 extend upwardly in the chamber 5 from the bottom 16 thereof. Casings 17 are provided on the upper ends of the tubes 15. The casings 17 are open at their tops and mounted therein are diaphragms 18. Coil springs 19 bias the diaphragms 18 in one direction.

Rotary valves 20 are interposed in the pipe 8 between the connection 9 and the rotors 10. Vertically adjustable rods 21 connect the diaphragms 18 to the arms 22 of the valves 20.

It is thought that the operation of the device will be readily apparent from a consideration of the foregoing. Briefly, the air pressure in the chamber 5 is the same as in the pneumatic tire 3. The valves 20 are normally closed. Should the pressure in the tire be too great, one of the diaphragms 18 will overcome the tension of its respective coil spring 19, which is comparatively light or weak, for opening the respective valve 20, thus permitting the air from the pressure chamber 5 to actuate the motor 10 on one end of the pipe 8. When the motor is thus actuated the clapper 14 thereon strikes the hub cap 1 for warning the operator of the vehicle that the pressure in the tire is too high. When the air in the tire drops to the correct pressure, the valve is again closed by its respective diaphragm 18 which is now actuated by its respective coil spring 19. If the pressure in the tire is too low the other diaphragm 18 is forced outwardly by its respective coil spring 19. Thus, the other valve 20 is opened for actuating the motor 10 on the other end of the pipe 8 for causing the clapper on said other motor to strike the hub cap 1. As this other diaphragm 18 is moved outwardly by its coil spring 19, the respective valve 20 continues to turn for shutting off the air to prevent deflation of the tire.

It is believed that the many advantages of a tire pressure alarm constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A tire pressure alarm comprising a hub cap for mounting on a vehicle wheel, a pressure chamber within said hub cap, means connecting said pressure chamber to a pneumatic tire on the wheel for receiving air under pressure therefrom, an air actuated motor connected to the chamber for receiving air therefrom for actuation thereby, a clapper actuated by said motor and engageable with the hub cap, and means for controlling the flow of air to said motor, the last-named means including a control valve interposed in the connection between the motor and the pressure chamber, a diaphragm mounted in the chamber and controlled by the pressure therein, a spring acting against said diaphragm and a rod connecting the valve to said diaphragm for actuation thereby.

2. A tire pressure alarm of the character described comprising a hub cap for mounting on a vehicle wheel, a pressure chamber within said hub cap, a conduit connecting said chamber to a pneumatic tire on the wheel for receiving air under pressure therefrom, a branched pipe connected, at one end, to the chamber, air actuated motors mounted on the branches of said pipe, clappers actuated by said motors and engageable with the hub cap, valves interposed in the pipe branches for controlling the flow of air to the motors, casings mounted in the chamber, diaphragms mounted in said casings and subjected to the pressure in the chamber, springs acting against said diaphragms and rods connecting the valves to said diaphragms for actuation thereby, one valve being arranged to be opened by pressure on one diaphragm when said pressure rises above a predetermined degree, the other valve being arranged to be opened by one of said springs when the pressure lowers below said degree and to be closed thereby as the pressure lowers further.

ARTHUR M. HEATH.